US 6,529,905 B1

(12) United States Patent
Bray et al.

(10) Patent No.: US 6,529,905 B1
(45) Date of Patent: Mar. 4, 2003

(54) METHOD AND SYSTEM FOR ALLOWING MULTIPLE USERS TO EDIT A HIERARCHICAL DATA STRUCTURE

(75) Inventors: Michael A. Bray, Idaho Falls, ID (US); Daniel R. Corsberg, Idaho Falls, ID (US)

(73) Assignee: Frontline Solutions, Inc., Idaho Falls, ID (US)

(*) Notice: Subject to any disclaimer, the term of this patent is extended or adjusted under 35 U.S.C. 154(b) by 0 days.

(21) Appl. No.: 09/481,228

(22) Filed: Jan. 11, 2000

(51) Int. Cl.[7] .............................................. G06F 17/30
(52) U.S. Cl. ............................. 707/8; 707/9; 707/100; 707/101; 707/102; 707/103 R
(58) Field of Search .................... 707/9, 8, 100–103 R

(56) References Cited

U.S. PATENT DOCUMENTS

| 4,399,504 | A |   | 8/1983  | Obermarck et al. |
|-----------|---|---|---------|------------------|
| 4,480,304 | A |   | 10/1984 | Carr et al. |
| 4,965,719 | A |   | 10/1990 | Shoens et al. |
| 5,226,159 | A |   | 7/1993  | Henson et al. |
| 5,287,521 | A |   | 2/1994  | Nitta et al. |
| 5,319,780 | A |   | 6/1994  | Catino |
| 5,537,645 | A |   | 7/1996  | Henson et al. |
| 5,623,659 | A |   | 4/1997  | Shi et al. |
| 5,826,265 | A | * | 10/1998 | Van Huben et al. ............ 707/8 |
| 5,835,910 | A | * | 11/1998 | Kavanagh et al. .......... 707/103 |
| 5,890,153 | A |   | 3/1999  | Fukuda et al. |
| 5,913,227 | A |   | 6/1999  | Raz et al. |
| 5,966,706 | A | * | 10/1999 | Biliris et al. .................. 707/10 |
| 6,275,935 | B1 | * | 8/2001 | Barlow et al. ............. 713/182 |
| 6,292,933 | B1 | * | 9/2001 | Bahrs et al. .................... 717/1 |

FOREIGN PATENT DOCUMENTS

| EP | 88305989.1 | 6/1988 |
| EP | 0414729 B1 | 1/1998 |

OTHER PUBLICATIONS

E. James Whitehead, Jr. WebDav: IETF Standard for Collaborative Authoring on the Web, IEEE Internet Computing, Sep.Oct. 1998 (p. 34–40).*
Bray et al. Extensible Markup Language (XML) 1.0: W3C Recommendation Feb. 10, 1998.

* cited by examiner

Primary Examiner—Kim Vu
Assistant Examiner—Cam-Y T Truong
(74) Attorney, Agent, or Firm—Thorpe North & Western, LLP

(57) ABSTRACT

A method for locking elements of a hierarchical data structure to allow multiple users at various distributed clients to simultaneously edit unlocked portions of the data structure, and systems for same are disclosed. The method includes checking for permission, setting and releasing various kind of locks. The structured authoring system of the invention may be distributed and collaborative. The process of checking for permission to set a lock is unique for each type of lock.

13 Claims, 8 Drawing Sheets

METHOD AND SYSTEM FOR ALLOWING MULTIPLE USERS TO EDIT A HIERARCHICAL DATA STRUCTURE

BACKGROUND OF THE INVENTION

1. Technical Field

This invention relates to the field of programming general purpose digital computers in a distributed software system. More particularly, this invention relates to document locking mechanisms in a collaborative structured authoring environment.

2. Background

The following definitions are useful in explaining the background of the invention and its detailed description. A "distributed system" is a software system in which multiple computers are connected together using some type of communication mechanism. Each of the computers in a distributed system is running one or more parts of the software system, requiring communication and coordination to accomplish a given function or task. A "collaborative system" is a software system that allows multiple users and/or processes to work in concert with each other on the same or closely related tasks. A distributed system is an essential enabler for a collaborative system since collaboration implies having multiple computers working at the same time. "Structured authoring" describes an approach to document authoring that is based on an underlying, predefined structure. Structured authoring implies a specific purpose document, or information type that is being created. In a structured authoring environment, types of information can be delineated and used, rules for enumeration and placement can be enforced, and guidance can be provided on missing information.

Structured authoring is particularly useful in developing complex documents that require input from many sources, for example, developing a request for proposal "RFP" in the government contracting context or developing a proposal in response to a RFP. Such complex documents may involve diverse expertise from engineering, accounting, marketing, legal, and management teams. Structured authoring may be applicable in any complex document management context.

Extensible Markup Language "XML" provides a standard or data structure for structured authoring. XML is a subset of the Standardized General Markup Language "SGML" tailored specifically for the Internet. Version 1.0 of the XML standard is available on the Internet at: http://www.w3.org./TR/REC-xml as of Jan. 4, 2000, the contents of which are herein incorporated by reference.

In distributed systems, as in structured authoring environments, there is frequently a need exists for multiple users (or clients) to share data or files. A "user" may be a computer process or an actual person at a workstation. The terms "user" and "client" will be used synonymously herein. Also, the terms "data" and "file" are used synonymously herein. Many conventional database management systems have locking mechanisms to allow multiple users to concurrently share data and prevent two or more users from changing the same unit of data or file at the same time. To "lock" data means to make a file, database record, or other data entity inaccessible. A locking scheme is a critical component of all multi-user software systems. When files are being shared, the operating system must ensure that two or more users do not attempt to modify the same file simultaneously. When database records are being shared, the database management system must ensure that two or more users do not attempt to modify the same data record (or set of data records) simultaneously. By locking a file, a user indicates the intention to modify the file. A well designed locking scheme is a trade off between ensuring the integrity of the data and minimizing the scope of the locking. This trade off occurs because locking data prevents others from performing certain functions. For example, the simplest approach to locking would be to lock all data as soon as one user wants to perform an operation. However, this effectively prevents everyone else from doing anything with the entire data set.

In practice, there are many different kinds of file locks. For example, locks for exclusive access, locks for shared access, locks on portions of a file and locks on the entire file. Conventionally, data structures describing the locks that have been placed on a file are kept on the same server (or computer system) as where the file is located. Users requesting a lock would then communicate with the file's server. In the case where only a single user is using the file, the data structure for the locks may be kept at that user's machine.

Conventional techniques for creating and locating data structures for locking mechanisms at the server or client machine are disclosed in U.S. Pat. Nos. 5,537,645 and 5,226,169. U.S. Pat. Nos. 4,399,504, 4,480,304 and 4,965,719 disclose locking methods for concurrently used resources in a multiprocessing, multiprogramming environment. U.S. Pat. No. 5,287,521 discloses a method and apparatus for releasing and obtaining shared and exclusive locks on data blocks in a multiprocessing, multiprogramming environment allowing serialization of access to the data blocks by multiple users. U.S. Pat. No. 5,913,227 discloses an agent-implemented locking mechanism for synchronizing access to a data object. U.S. Pat. No. 5,623,659 discloses a parent/child subset locking scheme for versioned objects. U.S. Pat. Nos. 5,890,153 and 5,319,780 disclose locking schemes for database management systems.

However, none of these patents appears to address accessing and locking all or portions of a hierarchical data structure, such as a hierarchically structured document. Furthermore, the conventional locking mechanisms disclosed do not appear to use or suggest a locking scheme or mechanism "tuned" to the software application rather than "tuned" to a database storage and management system. Thus, a need in the art exists for a method and system for locking hierarchically structured documents in a structured authoring environment. Furthermore, a need exists in the art for a locking scheme that ensures data integrity while, at the same time, minimizes the scope of the data locking to maximize the amount of the data structure available to other users.

SUMMARY OF THE INVENTION

A method for locking elements of a hierarchical data structure to allow multiple users at various distributed clients to simultaneously "edit" unlocked portions of the data structure, and systems for same are disclosed. The method of the invention includes checking for permission, setting and releasing various kind of locks. The structured authoring system of the invention may be distributed and collaborative. The process of checking for permission to set a lock is unique for each type of lock.

A method of "edit locking" a target element includes requesting permission to edit lock a target element, checking for locks of any kind on the target element, checking for locks of any kind on the parent of the target element, checking for locks of any kind on a child of the target element and checking for delete locks along a branch from the target element to the root, inclusive. If any such locks are found, the permission to lock the target element is denied. Otherwise the permission is granted, the lock is set, and the client releases the lock when it is done editing.

A method of "create locking" a target element includes requesting permission to create lock a target element, checking for locks of any kind on the target element and checking for delete locks along a branch from the target element to the root, inclusive. If any such locks are found, the permission to lock the target element is denied. Otherwise the permission is granted, the lock is set, and the client releases the lock when it is done creating. Note, that for a "create lock", the target element is the parent node of the element to be created.

A method of "delete locking" a target element includes requesting permission to delete lock a target element, checking for locks of any kind on the target element, checking for locks of any kind on the parent of the target element, checking for edit locks or create locks on the subtree of the target element, checking for delete locks along a branch from the target element to the root, inclusive, and checking for create locks or edit locks on opposing cross-references in a subtree of the target element. If any such locks are found, the permission to lock the target element is denied. Otherwise the permission is granted, the lock is set, and the client releases the lock when the deletion is completed.

A system embodiment including data storage, information management in a middle tier and distributed clients are disclosed. The system embodiment includes the method of locking a hierarchical data structure as disclosed herein.

These embodiments, methods and attendant advantages of the invention will be readily understood by reading the following detailed description in conjunction with the accompanying figures of the drawings.

BRIEF DESCRIPTION OF DRAWINGS

In the drawings, which illustrate what is currently regarded as the best mode for carrying out the invention, and in which like reference numerals refer to like parts in different views or embodiments.

DETAILED DESCRIPTION OF THE INVENTION

Figure 1:
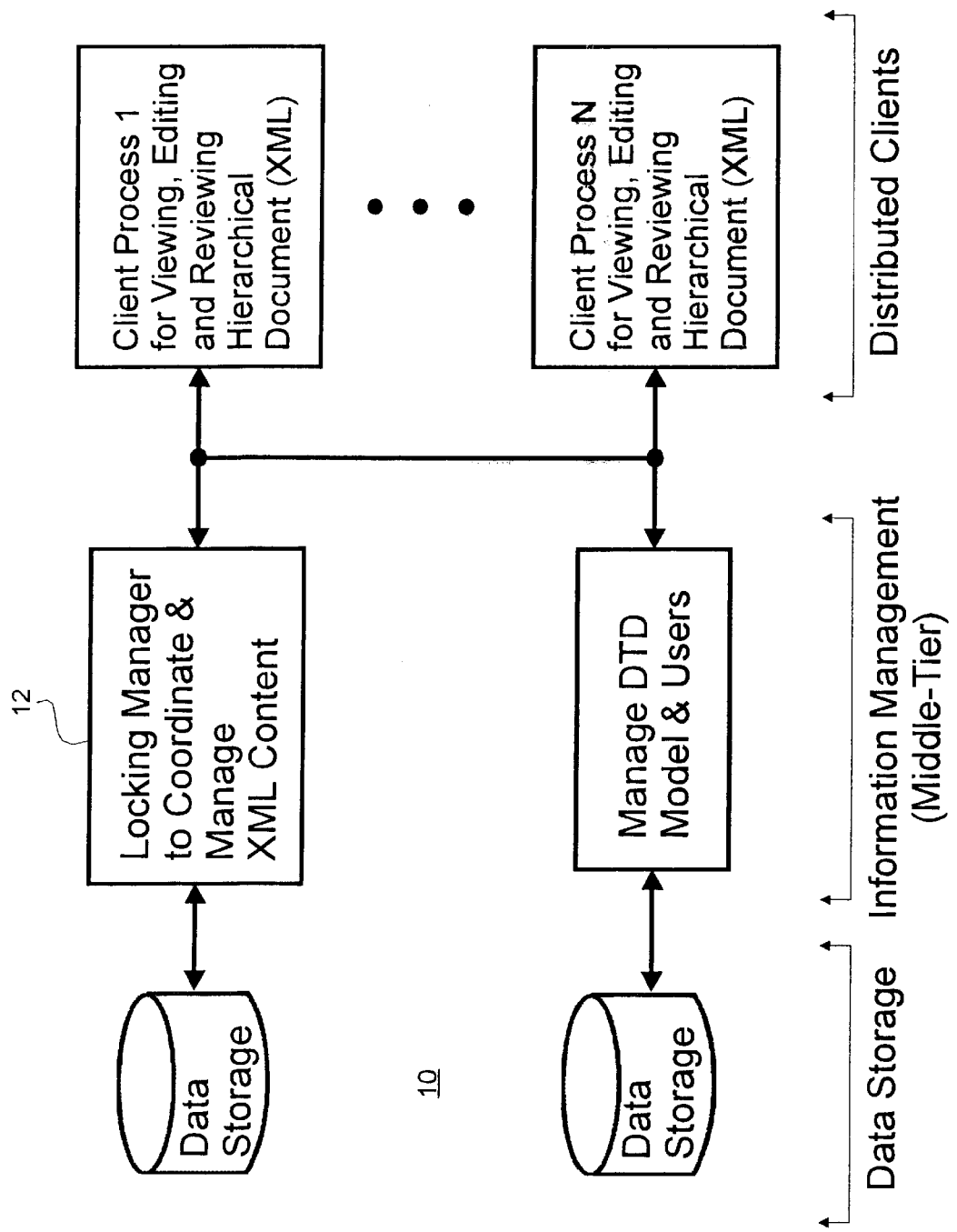
FIG. 1 is a block diagram of a structured authoring system with a locking scheme according to the invention.

The following detailed description discloses various embodiments of a method of locking elements in a hierarchical data structure and a structured authoring system including same. Referring to FIG. 1, a block diagram of a structured authoring system 10 with a locking scheme according to the invention. A structured authoring system 10 includes data storage, a "middle tier" providing information management, and one or more distributed clients which may be remotely located. The middle tier implements the logic and functionality to properly coordinate, manage, and enforce rules relating to the information being created. The blocks shown in FIG. 1 may be located on a single computer system or on many different computer systems. The preferred system architecture for a structured authoring system includes multiple servers (or computer systems) that provide centralized services to multiple clients. The structured authoring system disclosed herein has been used with as many as 25 users at one time. The upper limit on the number of users is dependent upon network bandwidth and server performance.

The blocks shown in FIG. 1 preferably communicate using Transmission Control Protocol/Internet Protocol "TCP/IP" and Java's Remote Method Invocation "RMI". This allows the structured authoring system 10 to work on all WINDOWS® NT-based networks as well as on the Internet. However, the blocks shown in FIG. 1 may communicate using any communication protocol suitable for the purpose of the invention. For example, and not by way of limitation, the blocks shown in FIG. 1 may communicate using Microsoft® Office Developer Edition "ODE" Tools, or the Common Object Request Broker Architecture "CORBA". TCP/IP, RMI, ODE and CORBA are communication protocols well known to one of skill in the art and thus will not be further detailed.

As shown in FIG. 1, the middle tier of the system coordinates and manages the information that all of the distributed clients create, use, and/or delete. An integral task for the middle tier is to ensure that one user does not overwrite or modify information that another user is in the process of modifying. In technical parlance, this is referred to as "application-level locking." In database locking, the locking mechanisms are typically implemented and enforced at the data storage tier and typically within a database product or service. In application-level locking, the locking mechanisms are implemented and enforced either in the middle-tier or in the client tier. Thus, application-level locking is performed outside of the database itself. It is also possible to perform the application-level locking in addition to the locking mechanism used in the database itself. Application-level locking is advantageous because it may be "tuned" to the nuances of what the software application is being used for. The locking scheme disclosed herein is an application-level locking approach that is independent of the underlying database or data storage.

Figure 3:
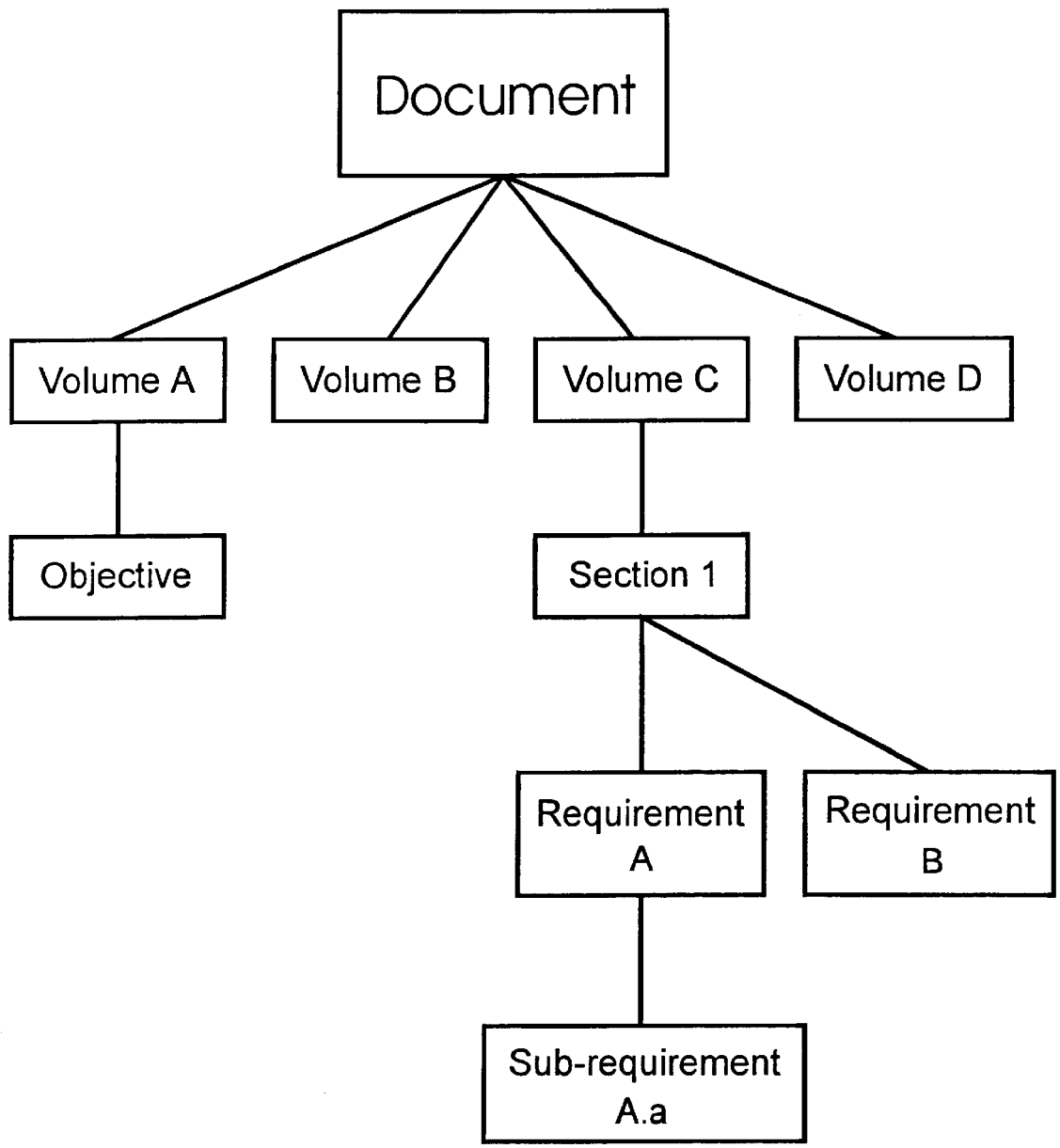
FIG. 3 is a block diagram of a hierarchically structured document.

FIG. 3 illustrates a block diagram of a hierarchically structured document in accordance with the invention. Referring to FIG. 3, a typical sequence from a user's perspective illustrating the locking scheme follows. Suppose User #1 is viewing Requirement A and decides to add some more content. User #1 attempts to switch from the view mode to the edit mode on Requirement A. If no one else is editing or in some way modifying Requirement A, User #1 is switched to the edit mode. Meanwhile, User #2 is viewing Requirement A and decides to add some content as well. User #2 attempts to switch from the view mode to the edit mode. Since User #1 is already editing Requirement A, there is an existing lock that prevents User #2 from switching to the edit mode. User #2 is notified of this situation and prevented from editing that Requirement A at that time.

Once User #1 has released the lock on Requirement A, User #2 may then edit Requirement A, unless User #1 actually deleted Requirement A.

The structured authoring system 10 is implemented using XML as the basis for authoring, reviewing, and using information. The system disclosed uses hierarchical (or tree) structured documents in combination with certain authoring functions. XML is used to define the allowable relationships between entities. An XML document or fragment of a document will have a single "root" entity that is the parent of all of the underlying subtree. A single node can have many children, but a node can only have one parent. If a node has no children, it is termed a "leaf" as it is at the end of a particular branch of the tree. In the example hierarchical document structure of FIG. 3, "Document" is a root. Parent-child relationships can be traversed down to all of the tree leaves (e.g., "Requirement B", "Objective" and "Sub-requirement A.a").

The use of XML allows nodes and subnodes to be established in the document type definition (DTD) as specified in the XML specification. Thus, the delineation between what is a node and what is a subnode is predetermined as part of developing the DTD. A node is a grouping of elements that are edited, viewed, and modified together. Thus, editing a node will cause an editor to be called up for viewing and editing one or more elements in the node. Put in more generic terms, a node is a predefined abstraction/grouping of elements that are worked and used together. For example, in a proposal, a requirement would be a node that would contain subnodes such as a title, body, text, figures, etc.

Figure 5:
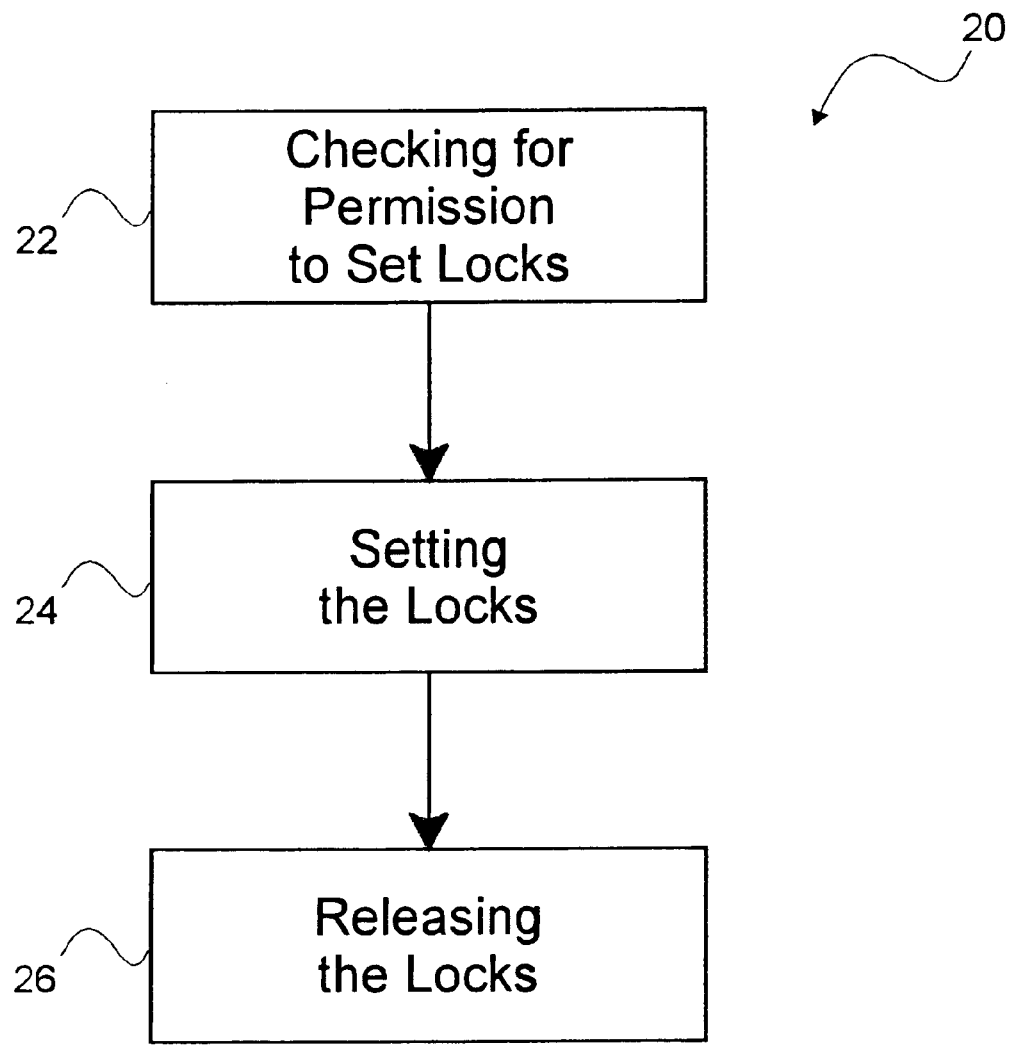
FIG. 5 is a high-level flow diagram of the locking method according to the invention.

Referring to FIG. 1, the locking method of the invention is managed by the locking manager 12 in the middle tier of the structured authoring system 10. Requests for the various types of locks come from a distributed client based on user actions. FIG. 5 is a high-level flow diagram of the locking method 20 according to the invention. In the structured authoring system 10 the locking manager 12 performs the steps of checking 22, setting 24 and releasing 26 of the locks. It should be noted that lock checking 22 must be performed as an atomic operation, meaning that, once started, lock checking must be completed prior to the locking manager 12 beginning another action.

When a lock request is received by the locking manager 12, it contains information identifying the target element and a lock type. As shown in FIG. 5, the first step is checking for permission to set the lock 22. The type of lock requested drives the process for checking permission to set the lock 22. In the preferred embodiment, the checking step 22 produces a lock record. If the locking manager 12 denies permission to set the lock, the lock record contains the user and element that is blocking the lock. If the locking manager 12 grants permission to set the lock, the lock record contains a vector of element IDs that will have locks placed on them. In either case, permission denied or permission granted, the lock record is returned to the distributed client that requested the lock. The next step in the process is setting the locks 24. The results of setting the locks are detailed below for each of the three different types of locks, i.e., edit locks, create locks and delete locks.

Releasing the locks 26 is handled on an element by element basis by the client. The client knows what locks were set based on information contained in the lock record. Additionally, the client knows when certain locks can be released. For example, during the edit process, the parent of the element being edited needs to be locked only for the time period that the new version of the element is being created. Once that new version is created and prior to letting the user start editing, the client can release the lock on the parent element.

Figure 2:
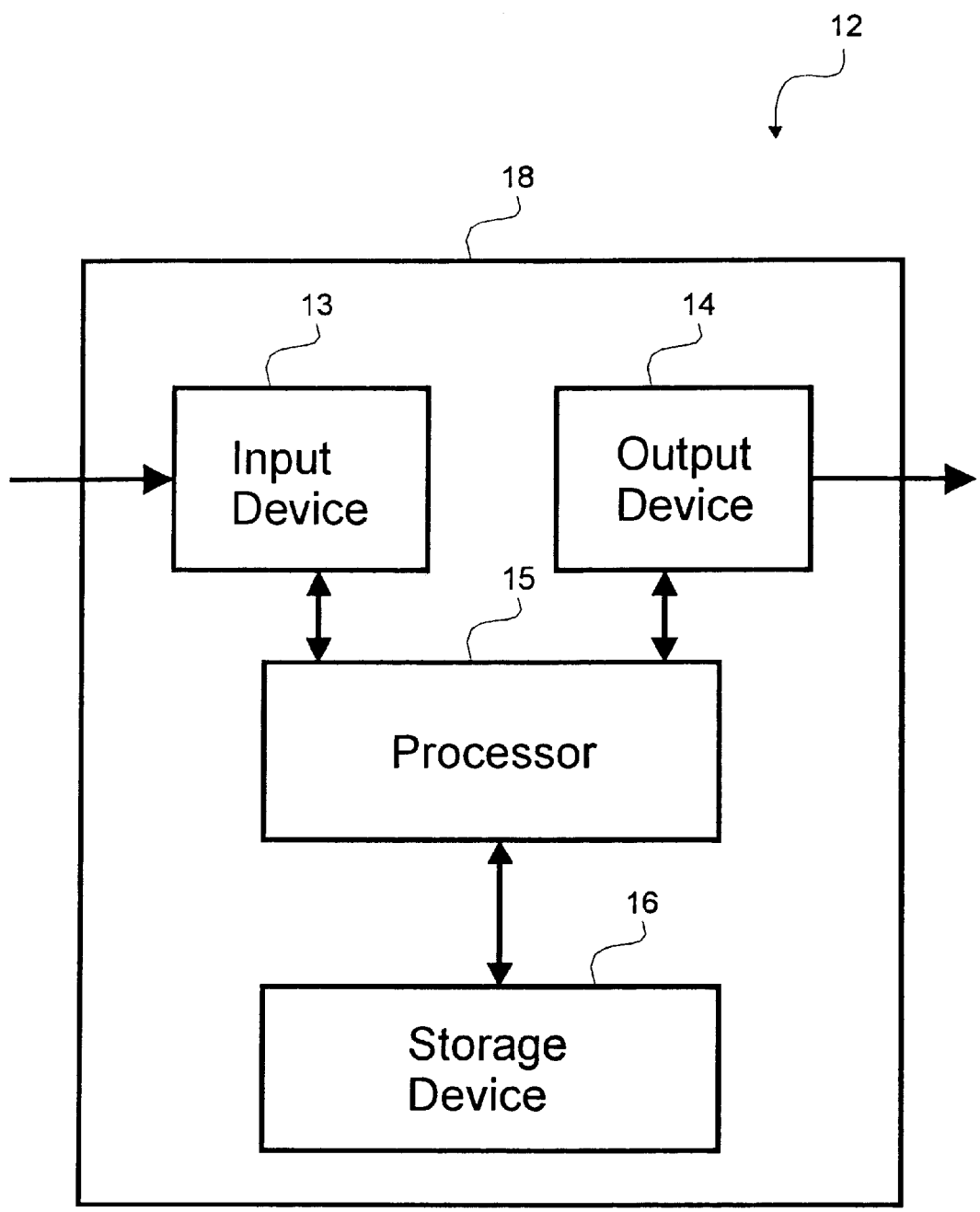
FIG. 2 is a block diagram of a computer system embodiment of the locking manager of FIG. 1.

Referring to FIG. 2, the locking manager 12 may be implemented in a computer system 18. The computer system 18 may include an input device 13, an output device 14, a processor 15 and a storage device 16. The input device 13 may be a keyboard to allow user input. Output device 14 may be a computer monitor. Input device 13 and output device 14 may be combined in a network interface to allow for communication with other computer systems. Processor device 15 may be a general purpose microprocessor or a processor mounted on a circuit card with supporting circuitry. Storage device 16 may be a hard disk drive, or other mass storage device. Storage device 16 may include dynamic random access memory or any other kind of solid state memory device suitable for storing data or computer programs (software). Computer system 18 may further include a memory device (not shown). The memory device may be a dynamic random access memory or any other kind of solid state memory device suitable for storing data or software instructions. The method of locking a target element and other methods of the invention as disclosed herein may be implemented in software instructions and stored on storage device 16 or memory device (not shown) for execution by the processor 15.

The structured authoring system 10 of the invention supports a variety of authoring functions. Such authoring functions include node creation, node content modification or editing, node viewing, and node deletion. Each of these authoring functions has unique requirements for locking. According to the locking method 20 of the invention, there are several authoring functions that cause different locking sequences and actions to take place. Each locking sequence is discussed in detail below. The locking sequences are based on the structured authoring functions of viewing, editing, creation, and deletion. The locking actions and the scope of the locks are discussed in terms of the hierarchical nature of the structured information.

Viewing Function

No locking mechanism is necessary for simply viewing a node or group of nodes in the tree. Thus, in FIG. 3, multiple users may view any portion of the tree without preventing any other users from viewing or taking other actions on the portion of the tree being viewed. Viewing will not cause any locks to be placed anywhere in a given document structure.

Editing Function

Editing the content of a node will cause an "edit lock" to be placed on the node that is being edited (target node). During the editing session itself, the lock is placed on the node and not on the entire underlying subtree. This function allows other users to edit nodes above, below, or in other branches of the document structure.

Rules for Establishing an Edit Lock

An edit lock request is placed at the node level and is always enforced by the locking manager 12, FIG. 1. An edit lock request may not be placed on a subnode. An edit lock is used to support an open editor on a distributed client. That editor is only working on the target element's child subnode structure. The target element's children vector is manipulated by the editor (as subnodes are created and deleted), requiring that an edit lock must lock the target element's children vector until the edit session is completed. If the target element only has children that are subnodes, then there are no children nodes which become locked. However, if the target element has children that are nodes, locking the children vector will preclude the child nodes from being edited by other distributed clients. This situation occurs because editing an element creates a copy of that element, which must be reflected in the parent's child vector. Locking the children vector will prevent someone else from cross-referencing into this element, since cross-referencing directly affects the element's children vector. The edit lock will remain in place until the client requests its removal.

Figure 6:
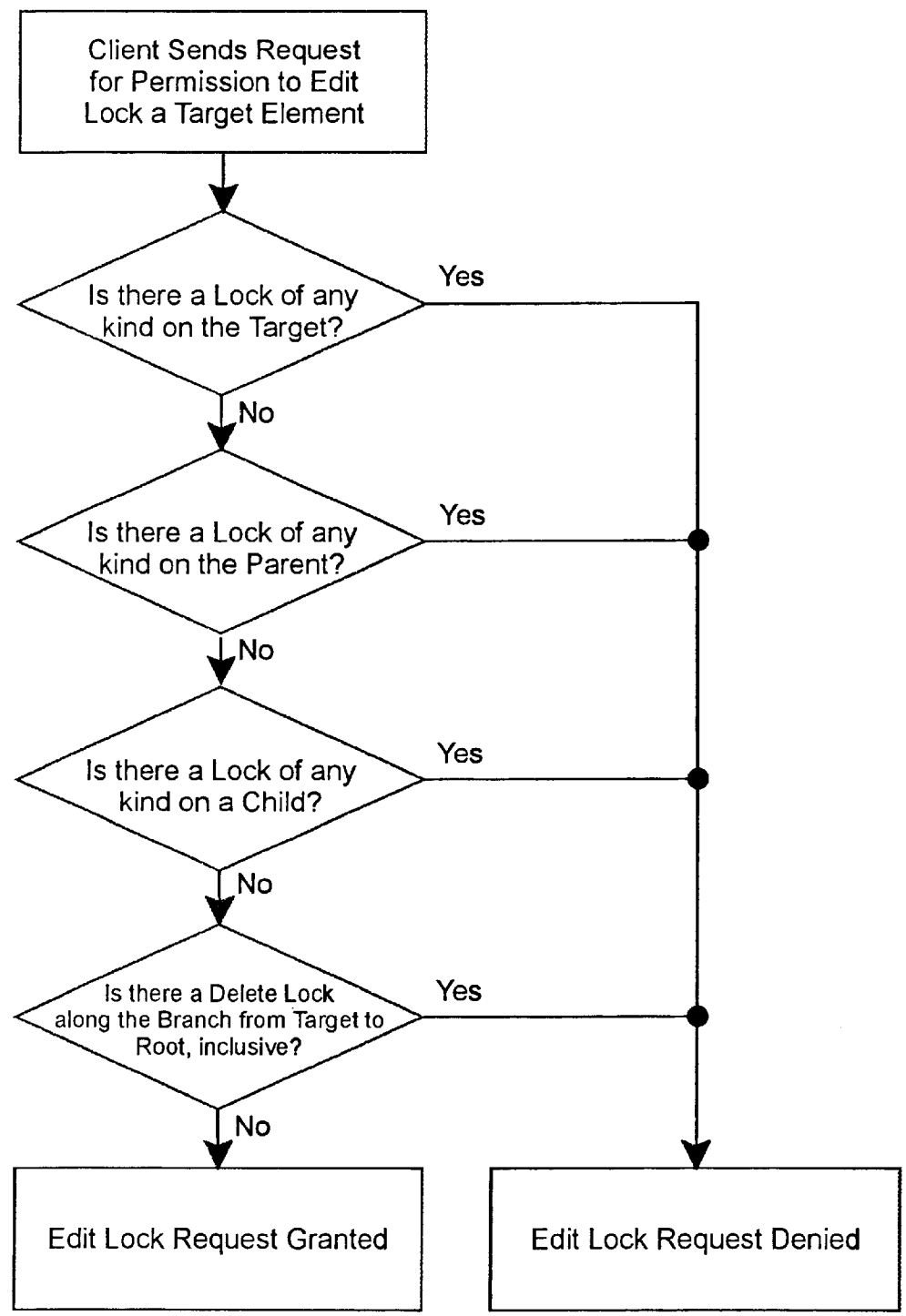
FIG. 6 is a flow diagram illustrating the process of checking for permission to set an edit lock according to the invention.

FIG. 6 is a flow diagram illustrating the rules for checking whether an edit lock may be set or not. FIG. 6 includes the rules associated with establishing an edit lock. The edit lock checking process begins with a client sending the locking manager 12 a request for permission to edit lock a target element. The request includes target element identification and that it is an edit lock that is requested.

1. If a lock of any kind is present on the target element, the edit lock is denied. For example in FIG. 3, if Section 1 is the target element, there could not be any type of lock on Section 1.

2. If the parent is already locked with any kind of lock, the edit lock is denied. Continuing with the example above, since Volume C is the parent of Section 1, the edit lock request will be denied if there is any kind of lock on Volume C.

3. If any of the target's child nodes are locked with any kind of lock, the edit lock is denied. Thus, if Requirement A is already locked with a delete lock, the edit lock request will be denied.

4. If a delete lock exists along the branch from the target element to the document root, inclusive, the edit lock is denied. Continuing with the previous example, an edit lock request will be denied if there were any delete locks on Volume C or on the Document root. There may be delete locks on any of the other branches of the tree (e.g., Volume A, B, or D) or below the target node (e.g., Requirement A, Requirement B or Sub-requirement A.a).

5. If a delete lock exists in the target element's subtree, it is ignored in terms of acquiring this edit lock. If a create or an edit lock exists in the target element's subtree (beyond the first level), it is ignored in terms of acquiring this edit lock.

There are no other restrictions on existing locks in the document structure. Thus, any kind of lock as disclosed herein could exist in the subtree below Section 1 and in any of the other branches of the tree, see FIG. 3. The order of checking for existing locks above is immaterial.

Setting an edit lock will have the following effects:

1. An edit lock is placed on the target element

2. A create lock is placed on the target element's parent until the new version is instantiated and returned, clearing the create lock.

3. Edit lock(s) are placed on the child node(s) of the target element until the new version is instantiated and returned, clearing the edit lock(s).

It should be noted that the above edit and create locks listed in paragraphs 1–3 immediately above are necessary to support versioning of the element being edited. The idea behind versioning is that the previous version of an edited element may be archived for later use. However, if the authoring environment does not track edited versions or edited versions are not necessary, then the checks and locks on the target's parent and immediate children are not needed, since a new version of the target will not be created.

Creating Function

Creating a new node will cause a "create lock" to be placed on the new node's parent. During the creation process itself, the create lock will be placed on the parent node and not on the parent's entire underlying subtree allowing other users to edit nodes above, below, or in other branches of the document structure. It should be noted that with respect to the creating function and the rules for establishing a create lock, the target element is the parent of the element to be created, unlike in the case for deleting and editing where the target element is the element to be deleted or edited, respectively.

Rules for Establishing a Create Lock

A create lock request can only be placed at the node level and is always enforced by the locking manager 12, FIG. 1. A lock request may not be placed on a subnode. The target element's children vector will be affected by the insertion of a newly created element. Since order is important and the client determines the appropriate insertion point from the children vector, this vector must be locked until the insertion is complete.

Figure 4:
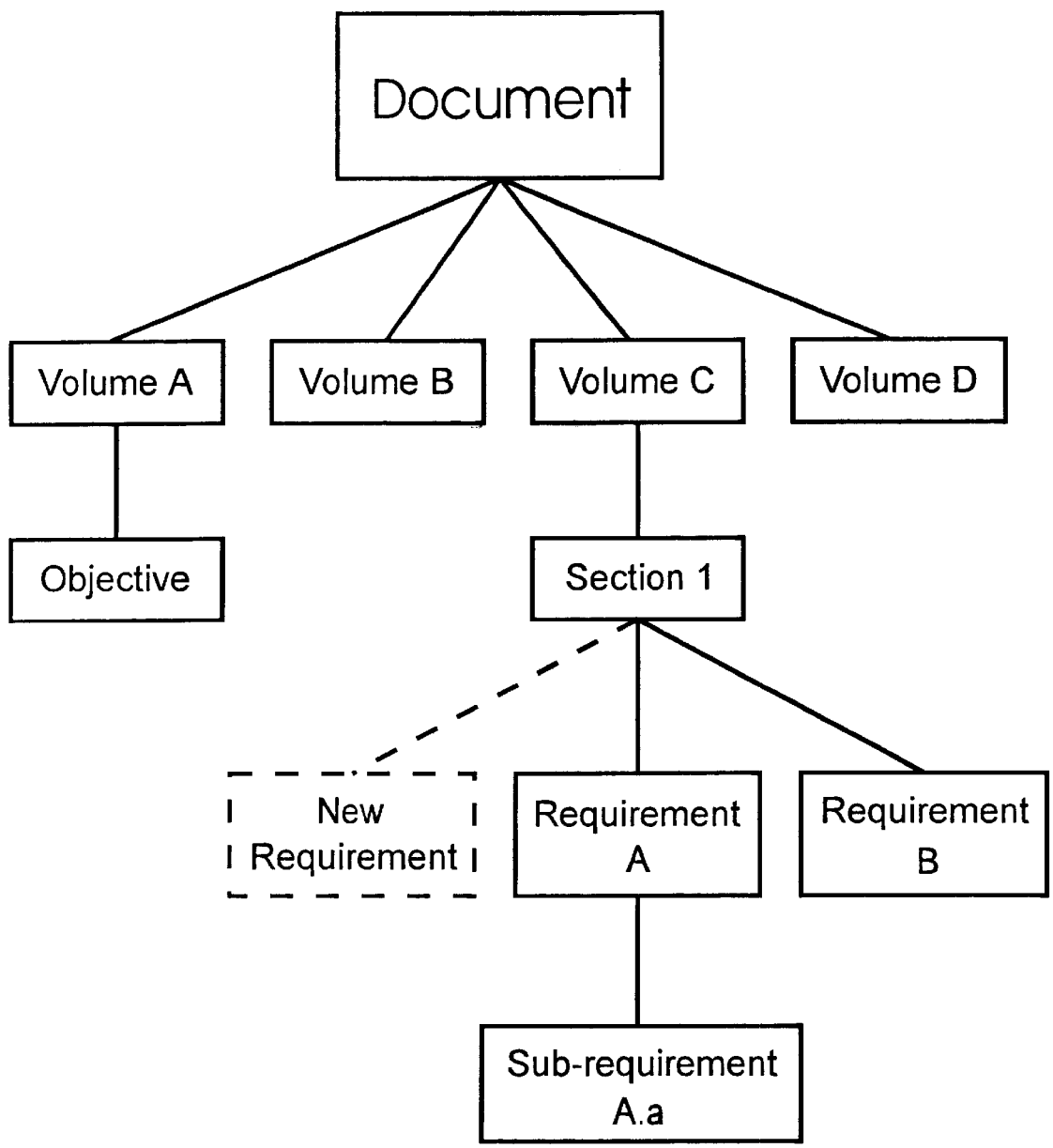
FIG. 4 is a block diagram of a hierarchically structured document for illustrating a create lock according to the invention.
Figure 7:
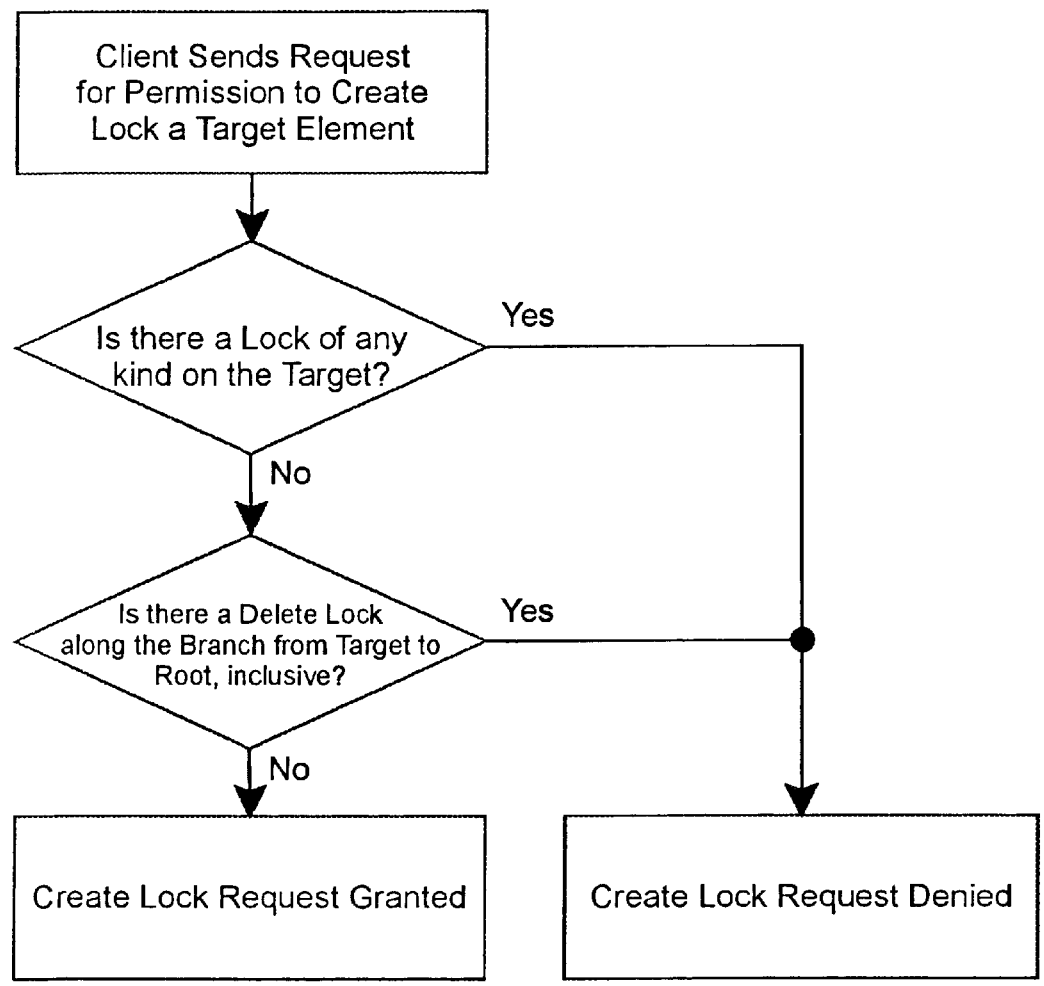
FIG. 7 is a flow diagram illustrating the process of checking for permission to set a create lock according to the invention.

FIG. 7 is a flow diagram illustrating the process of checking for permission to set a create lock according to the invention. FIG. 7 includes the rules associated with establishing a create lock. The process begins with a distributed client requesting permission to create lock a target element. The request includes target element identification and that a create lock is desired. Referring also to FIG. 4, assume that a user wants to create a new node under "Section 1". Thus, Section 1 would be the parent and target element, and Requirement A and Requirement B would be siblings of the new node.

1. If a lock of any kind exists on the target element, the create lock request is denied. In FIG. 4, a create lock will be denied if there is any kind of lock on Section 1.

2. If a delete lock exists along the branch from the target element to the document root, inclusive, the create lock request is denied. For example in FIG. 4, a create lock will be denied if there are any delete locks on Volume C or on the Document root. There may be delete locks on any of the other branches of the tree (e.g., Volume A, Volume B or Volume D) or below the parent node (e.g., Requirement A, Requirement B or Sub-requirement A.a).

3. If a delete lock exists in the target element's subtree, it is ignored in terms of acquiring a create lock.

Other than the delete lock constraints discussed above, there are no other restrictions on existing locks in the document structure. Thus, locks could exist in the subtree below Section 1, in the branch above Section 1, and in any of the other branches of the tree. The order of checking for existing locks above is immaterial. However, as noted above, lock checking must be performed as an atomic operation that cannot be interrupted until completed.

Setting a create lock will have the following effect:

1. A create lock is placed on the target element until the client requests its removal.

Deleting Function

Deleting a node will cause a delete lock to be placed on the node to be deleted. During the deletion process itself, a delete lock will be placed on the target node and will effectively lock the entire underlying subtree. In addition, a lock is placed on the target node's parent. Both locks are released once the deletion process is complete. These locks will prevent any further modification of the underlying subtree of the target node as well as any modifications of the target node's parent. Other users can modify and/or edit nodes above or in other branches of the document structure.

Rules for Establishing a Delete Lock

Figure 8:
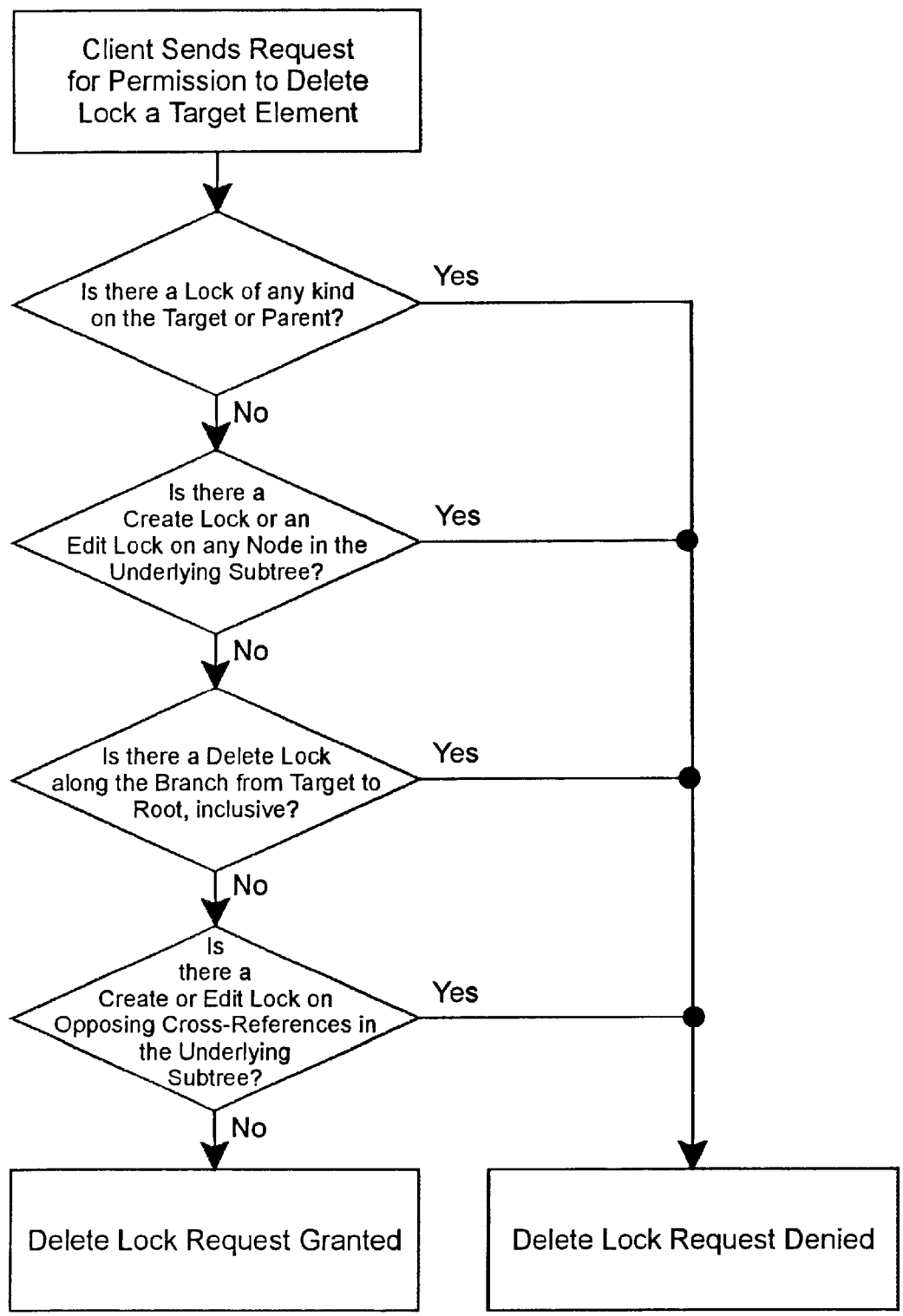
FIG. 8 is a flow diagram illustrating the process of checking for permission to set a delete lock according to the invention.

FIG. 8 is a flow diagram illustrating the process of checking for permission to set a delete lock according to the invention. FIG. 8 includes the rules associated with establishing a delete lock. The process begins with a distributed client sending a request for permission to delete lock a particular target element. As in the case with other lock requests, a delete lock request will include a target element identification and that it is a delete lock request. Referring also to FIG. 3, the rules for establishing a delete lock are illustrated below. Assume that a user wants to delete the node "Section 1". Thus, Section 1 is the target node and Volume C would be the target node's parent.

1. If a lock of any kind exists on the target node, the delete lock request is denied. If, for example, there were a create lock or an edit lock already placed on Section 1 in FIG. 3, the delete lock request will be denied.

2. If a lock of any kind exists on the parent node, the delete lock request is denied. For example in FIG. 3, a delete lock will be denied if a delete lock, an edit lock or a create lock existed on Volume C.

3. If a create lock or an edit lock exists in the underlying subtree of the target element, the delete lock request is denied. Thus, in FIG. 3, a delete lock request will be denied if there is a create lock or an edit lock on Requirement A, Requirement B, or Sub-requirement A.a. If there is an existing delete lock in the target element's subtree, it is ignored in terms of acquiring a delete lock.

4. If a delete lock exists on any node along the branch from the target element to the document root, inclusive, the delete lock request is denied. For example in FIG. 3, if a delete lock exists on either Volume C or the Document root, the delete lock request would be denied. However, delete locks may exist on any of the other branches of the tree (e.g., Volume A, B, or D) or below the target node (e.g., Section 1), and still not prevent the delete lock from being placed on Section 1.

5. If a create lock or an edit lock exists on either of the opposing end points of any cross-references in the target's underlying subtree, the delete lock request is denied.

Other than the lock constraints discussed in rules 1–5 above, no other restrictions on existing locks in the document structure are required. The order of checking for existing locks above is immaterial, but checking must be completed as an atomic operation as noted above.

Setting a delete lock will have the following effects:

1. A delete lock will preclude all kinds of locks in the entire subtree below it.

2. A delete lock will place a delete lock on the target element.

3. A delete lock will place an edit lock on the parent of the target element (since the parent's children vector will be affected by the deletion of the target element).

4. A delete lock will place edit locks on the opposing end points of cross-references in the target's subtree, if there are any.

The structured authoring system 10 disclosed herein may be used to collaboratively author virtually any kind of document that might require more than one author. By way of example, and not by way of limitation, such structured documents may include proposals, requests for proposals, environmental permits, legal documents, and planning documents.

Although this invention has been described with reference to particular embodiments, the invention is not limited to these described embodiments. Rather, it should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A structured authoring system for editing a hierarchical data structure in a multi-user environment, the system comprising:

data storage for storing said hierarchical data structure;

at least one distributed client configured to edit said hierarchical data structure;

a locking manager in communication with said data storage and said at least one distributed client for controlling access to elements within said hierarchical data structure during processing of authoring functions initiated by at least one user from said at least one distributed client, said authoring functions including:

an edit function using an edit lock;

a create function using a create lock;

a delete function using a delete lock; and wherein said edit lock comprises:

said at least one distributed client initiating an edit function by sending an edit lock request to said locking manager identifying a target element;

said locking manager denying said edit lock request if a lock of any kind exist on said target element;

said locking manager denying said edit lock request if the parent of said target element is already locked with any kind of lock;

said locking manager denying said edit lock request if any child of said target element is already locked with any kind of lock;

said locking manager denying said edit lock request if a delete lock exists between the said target element and a document root, inclusive; and otherwise granting said edit lock request until said edit function is complete; and wherein said hierarchical data structure is a document that conforms to an extensible markup language (XML) standard.

2. The structured authoring system of claim 1 wherein authoring functions further includes a view function.

3. The structured authoring system of claim 1 wherein said document that conforms to an XML standard is a request for proposal.

4. The structured authoring system of claim 1 implemented on a single computer system.

5. The structured authoring system of claim 1, wherein said locking manager communicates with said data storage and said at least one distributed client using Transmission Control Protocol/Internet Protocol (TCP/IP) and Java's Remote Method Invocation (RMI).

6. A structured authoring system for editing a hierarchical data structure in a multi-user environment, the system comprising:

data storage for storing said hierarchical data structure;

at least one distributed client configured to edit said hierarchical data structure;

a locking manager in communication with said data storage and said at least one distributed client for controlling access to elements within said hierarchical data structure during processing of authoring functions initiated by at least one user from said at least one distributed client, said authoring functions including:

an edit function using an edit lock;

a create function using a create lock;

a delete function using a delete lock; and wherein said create lock comprises:

said at least one distributed client initiating a creating function by sending a create lock request to said locking manager identifying a target element;

said locking manager denying said create lock request if a lock of any kind exists on said target element;

said locking manager denying said create lock request if a delete lock exists along a branch between the said target element and a document root, inclusive; and otherwise granting said create lock request until said creating function is complete; and wherein said hierarchical data structure is a document that conforms to an extensible markup language (XML) standard.

7. The structured authoring system of claim 6 wherein authoring functions further includes a view function.

8. The structured authoring system of claim 6 wherein said document that conforms to an XML standard is a request for proposal.

9. The structured authoring system of claim 6 implemented on a single computer system.

10. A structured authoring system for editing a hierarchical data structure in a multi-user environment, the system comprising:

data storage for storing said hierarchical data structure;

at least one distributed client configured to edit said hierarchical data structure;

a locking manager in communication with said data storage and said at least one distributed client for controlling access to elements within said hierarchical data structure during processing of authoring functions initiated by at least one user from said at least one distributed client, said authoring functions including:

an edit function using an edit lock;

a create function using a create lock;

a delete function using a delete lock; and wherein said delete lock comprises:

said at least one distributed client initiating a deleting function by sending a delete lock request to said locking manager identifying a target element;

said locking manager denying said delete lock request if a lock of any kind exists on said target element;

said locking manager denying said delete lock request if a lock of any kind exists on a parent node of said target element;

said locking manager denying said delete lock request if a delete lock exists along a branch between the said target element and a document root, inclusive;

said locking manager denying said delete lock request if a create lock exists or an edit lock exists in an underlying subtree of said target element; and otherwise granting said delete lock request until said delete function is complete; and wherein said hierarchical data structure is a document that conforms to an extensible markup language (XML) standard.

11. The structured authoring system of claim 10 wherein authoring functions further includes a view function.

12. The structured authoring system of claim 10 wherein said document that conforms to an XML standard is a request for proposal.

13. The structured authoring system of claim 10 implemented on a single computer system.

\* \* \* \* \*